(12) United States Patent
Casey, Sr. et al.

(10) Patent No.: US 7,644,960 B2
(45) Date of Patent: Jan. 12, 2010

(54) CLAMP

(75) Inventors: Aidan Casey, Sr., County Clare (IE);
Nuala Donnellan, County Clare (IE);
John Reginald Newton, Cumbria (GB)

(73) Assignee: GRQ Patents Limited (IE)

( * ) Notice: Subject to any disclaimer, the term of this patent is extended or adjusted under 35 U.S.C. 154(b) by 0 days.

(21) Appl. No.: 11/629,844

(22) PCT Filed: Apr. 25, 2006

(86) PCT No.: PCT/IE2006/000040
§ 371 (c)(1),
(2), (4) Date: Sep. 27, 2007

(87) PCT Pub. No.: WO2006/114780
PCT Pub. Date: Nov. 2, 2006

(65) Prior Publication Data
US 2008/0093844 A1    Apr. 24, 2008

(30) Foreign Application Priority Data
Apr. 25, 2005   (IE)   ................... S2005/0246

(51) Int. Cl.
*F16L 23/00*   (2006.01)

(52) U.S. Cl. ...................... 285/367; 285/410

(58) Field of Classification Search .............. 285/367, 285/366, 407, 411, 410, 409
See application file for complete search history.

(56) References Cited

U.S. PATENT DOCUMENTS

| | | | | |
|---|---|---|---|---|
| 2,878,041 | A * | 3/1959 | Hobbs | 285/367 |
| 3,744,825 | A * | 7/1973 | Cooper et al. | 285/407 |
| 3,966,240 | A * | 6/1976 | Enomoto | 285/367 |
| 4,640,530 | A * | 2/1987 | Abbes et al. | 285/18 |
| 5,645,303 | A * | 7/1997 | Warehime et al. | 285/409 |
| 5,692,563 | A * | 12/1997 | Krueger et al. | 166/85.5 |
| 6,672,631 | B1 * | 1/2004 | Weinhold | 285/409 |

* cited by examiner

*Primary Examiner*—David E Bochna
(74) *Attorney, Agent, or Firm*—Ostrolenk Faber LLP (57) ABSTRACT

A clamp for coupling mating radially projecting flanges, each flange having a tapered outer face. The clamp includes at least a pair of component halves. Each half includes a generally U-shaped cross-sectional profile having a base portion and two opposing side limbs projecting from the base portion defining a recess intermediate the side limbs for receiving the mating flanges and a bolt and a lug for fastening the component halves together. Each side limb has a contact face for abutting a tapered face of a flange and a non-contact face. The base portion has a non-contact face. The contact faces of the side limbs are remote from the non-contact face of the base portion.

15 Claims, 10 Drawing Sheets

CLAMP

CROSS REFERENCE TO RELATED APPLICATION

The present application is a 35 U.S.C. § 371 national phase conversion of PCT/IE 2006/000040, filed Apr. 25, 2006, which claims priority of Irish Patent Application No. S2005/0246 filed Apr. 25, 2005, which is herein incorporated by reference. The PCT International Application was published in the English language.

BACKGROUND OF THE INVENTION

The invention relates to a clamp and in particular to a coupling clamp for connecting objects such as pipes, tubing, ferrules etc.

Pipe coupling clamps are extensively used in industry, particularly in the food processing, chemical and pharmaceutical sectors. The requirements of these industries demand high levels of cleanliness and the ability to sterilise pipe installations which are typically made of stainless steel.

Typical pipe installations employ pipe coupling clamps to connect open ends of lengths of pipe. Normally, a clamp liner is installed about the open end of each of the open ends to be connected. Such a clamp liner has a radially projecting flange with a coupling surface distal from the pipe open end for mating with a coupling surface of the flange of a second clamp liner. A recess for receiving a gasket is provided in the coupling surface. In order to connect the pipe lengths, the coupling surfaces of the flanges with the gasket placed therebetween are placed together, and an annular coupling clamp is secured over the flanges to hold the flanges and the gasket in a sealed relationship. Such a coupling clamp has a recess formed in its inner surface for receiving the flanges. Outer faces of the flanges distal from the coupling surfaces taper towards their peripheral regions and when the clamp is installed, tapering walls of the inner surface which define the recess abut the outer faces.

The clamp liner and gasket design are specified in British Standard, BS 4825: Part 3: 1991, International Standard, ISO 2852: 1993(E) and German Standards DIN 32676 and DIN 11864/3. The coupling clamp used to hold the clamp liners and the gasket together is not specified in any of the standards, however in both standards a sample representation of a coupling clamp is shown. The purpose of showing a representation of a coupling clamp in these standards is to indicate clearance values at the interface between outer faces of the flanges and contact faces of the side limbs of the recess of the coupling clamp. Thus the standards illustrate a profile for the recess of the coupling clamp and this profile has been adopted as an industry standard, although only certain portions of recess profile are standardized. Such a profile of the recess, however, has not been optimised in most of commercially available coupling clamps and variations of the profile in different designs of coupling clamps give rise to unsatisfactory abutment at the interface of the recess and the clamp liners i.e. such clamps do not engage the clamp liners in a manner sufficient to establish and maintain a fluid-tight seal between coupling surfaces of flanges of the clamp liners and a sealing gasket placed therebetween and, as a consequence, fluid-tightness and cleanliness of pipe connection may be compromised.

A clamp having an "omega"-profile of the internal recess is supplied by Advanced Couplings Limited, a British company, for coupling ferrules. Side walls of the recess are arcuate and thus enable linear circumferential contact of the side walls with outer faces of the ferrules. This configuration does not depend on fluctuations of angular tolerances of the outer faces of the ferrules. The disadvantage of the linear contact is that concentrated forces acting on the ferrules result in increased stresses applied at the contact interface. Furthermore such an arrangement is not suitable for increased fluctuations of thickness of the ferrule assembly, as it often occurs with modern assemblies.

SUMMARY OF THE INVENTION

The present invention seeks to alleviate the problems associated with known coupling clamps.

The present invention provides a clamp for coupling mating radially projecting flanges, each flange having a coupling surface and a tapered face remote from the coupling surface, the clamp comprising at least a pair of component halves, each half comprising a generally U-shaped cross-sectional profile having a base portion and two opposing side limbs projecting from the base portion defining a recess intermediate the side limbs for receiving the mating radially projecting flanges, whereby the recesses face each other defining a central aperture therebetween and means for fastening the component halves together characterised in that each side limb has one or more distinct faces comprising a contact face and a non-contact face and the base portion has a non-contact face with the contact face of the side limbs being remote from the non-contact face of the base portion.

Ideally, the contact face tapers towards the non-contact face of the base portion at an angle to enable abutting contact with the tapered face of the mating radially projecting flanges.

Preferably, the non-contact faces of the side limbs and the non-contact face of base portion define an inner cavity and are sized and mutually disposed so as to prevent the mating flanges from contacting the non-contact faces of the side limbs and the non-contact face of base portion in use.

Ideally, each recess is arcuate.

Preferably, the length of the contact face is less than length of the tapered face of the mating radially projecting flange, wherein the length of the contact face is defined as the distance between the non-contact face and last point of contact for the contact face remote from the non-contact face of the base portion and the length of the tapered face of the mating radially projecting flange is defined as the distance between the widest section and the narrowest section of the tapered face. Preferably, the distance between the opposing non-contact faces of the side limbs is greater than the distance at the same point on the non-contact faces of the side limbs between the imagined extensions of the contact face tapered towards the base portion. Such an arrangement of the contact faces of the side limbs and the inner cavity result in that in use, the contact faces of the side limbs abut the tapered face of the flange along the entire width of the contact face of the side limbs without the non-contact face of the base portion and the base portion being in contact with the flanges regardless of fluctuations within their tolerances of the distance between the contact faces of the side limbs and/or the distance between the tapered faces of the flanges, thus ensuring correct and efficient load application onto the tapered faces of the flanges.

In a most preferred arrangement, the distance between the tapered contact faces of the side limbs and the tolerance for that distance are selected to enable the contact faces of the side limbs to abut the tapered faces of the flanges which have a sealing gasket placed between the coupling surfaces. In one embodiment, the distance and the tolerance are selected to enable the contact faces of the side limbs to abut the tapered faces of the flanges which have a teflon-coated gasket placed between their coupling surfaces. Such a gasket typically has greater thickness than a normal gasket and this results in greater distance between the tapered faces.

Ideally, the clamp is used for coupling radially projecting flanges of clamp liners installed about open ends of pipes. Typically, the sealing gasket placed between the coupling faces of the flange is resiliently deformable. Preferably, each contact face of the side limbs is sized to ensure abutment of the contact face of the side limbs with a predetermined area on the tapered face of the flange so that the load from the contact face of the side limbs is always directed to the predetermined area thereby ensuring that an effective fluid-tight seal is formed at the interface between the sealing gasket and the coupling faces of the flanges. Furthermore, the distance between the two contact faces of the side limbs is such to ensure the abutment is achieved regardless of fluctuations of the distance between the tapered faces of the flanges due to compression of the gasket in use. It will be appreciated that the invention is not limited to the use with only such clamp liners, and indeed can be used for coupling radially projecting flanges of various devices, such as for example, pipes, ferrules, bushings, couplings, tubing etc.

Ideally, the distance and the angle between the contact faces of the side limbs and the length of each contact face of the side limbs are selected such that when the flanges are manufactured to their mid-tolerance dimensions, an inner edge of each contact face of the side limbs rests on the tapered face of the flange and is spaced from a peripheral edge of the tapered face leaving a peripheral portion of the tapered faces uncovered, thus reserving sufficient area for an inner edge of the contact face of the side limbs to rest upon in case of fluctuations within their predetermined tolerances of the distance between the tapered faces of the flanges and the distance between the contact faces of the side limbs without the inner edges projecting beyond the peripheral edges of the tapered faces of the flanges.

In one arrangement, the angles of inclination of the contact faces of the side limbs in relation to a plane perpendicular to a central axis of the aperture defined by the recesses of the components halves in the closed position are the same and may be, for example, 15° to 30°, and preferably 15° to 20° and most preferably 20°. It will be appreciated that the invention is not limited to specific values of these angles and indeed, the angle of inclination of one contact face of the side limbs may differ from the angle of inclination of the opposing contact face of the side limbs.

In a preferred arrangement, each non-contact face of the side limbs extends from the inner edge of the corresponding contact face of the side limbs towards the non-contact face of the base portion, the non-contact face of the base portion extending at least between, and preferably beyond, points of intersection that would be made if the contact faces of the side limbs extended to or beyond the non-contact face of the base portion. Ideally, the non-contact faces of the side limbs extend at a shallower angle than that of the contact face of the side limbs in relation to a plane perpendicular to the central axis of the aperture defined by the recesses of the component halves. It will be appreciated that the non-contact faces of the side limbs may extend parallel to the aforementioned plane and may even diverge in the direction of the non-contact face of the base portion. Furthermore, the non-contact face of the side limbs and the non-contact face of the base portion need not to be flat. In a most preferred arrangement, however, each non-contact face of the side limbs extends at an angle of about 5° in relation to that plane.

In a most preferred embodiment, the components halves are substantially identical, thus making the component halves interchangeable and reducing costs of assembly and manufacture of the clamp of the invention.

Ideally, each component half has an ear at one end each ear being pivotally connectable to a hinge body via suitable means to enable movement of the component halves between open and closed positions.

Preferably, the hinge body comprises a pair of spaced-apart plates defining an opening therebetween and an intermediate member connecting the plates, wherein in use the ears are received in the opening.

The means for pivotally fastening the ears to the hinge body may, for example, comprise a pair of apertures formed in each plate, each aperture being co-axial with a corresponding aperture of the other plate, an aperture formed in each ear and a pair of pins for connecting the ears to the plates via the apertures.

In a preferred embodiment, each component half comprises a fork-shaped lug at the other end, the lug comprising a pair of prongs defining a space therebetween wherein after the manufacture of the component halves a suitable bore is formed transversely through the fork-shaped lug of one or both of the component halves for pivotally mounting a bolt, and wherein, when the lugs align in the closed position, the spaces between the prongs define a channel for receiving the bolt. In the closed position, a nut is screwed and tightened on the bolt to draw the component halves together in order to secure and maintain the flanges in a coupled relationship and/or to provide a fluid-tight seal at the interface between the sealing gasket and the coupling surfaces or the flanges.

The invention will now hereinafter be described with reference to the accompanying drawings which show by way of example only one embodiment of a coupling clamp in accordance with the invention.

In the drawings:

FIG. 9b is a plan view of the component half of FIG. 9a;

FIG. 9c is a cross-sectional view of the component half of FIG. 9a along the line Y-Y in FIG. 9a;

FIG. 10b is a side elevation of the hinge body of FIG. 10a;

FIG. 10c is a cross-sectional front elevation of the hinge body of FIG. 10a along the line X-X in FIG. 10a.

DESCRIPTION OF A PREFERRED EMBODIMENT

Figure 1:
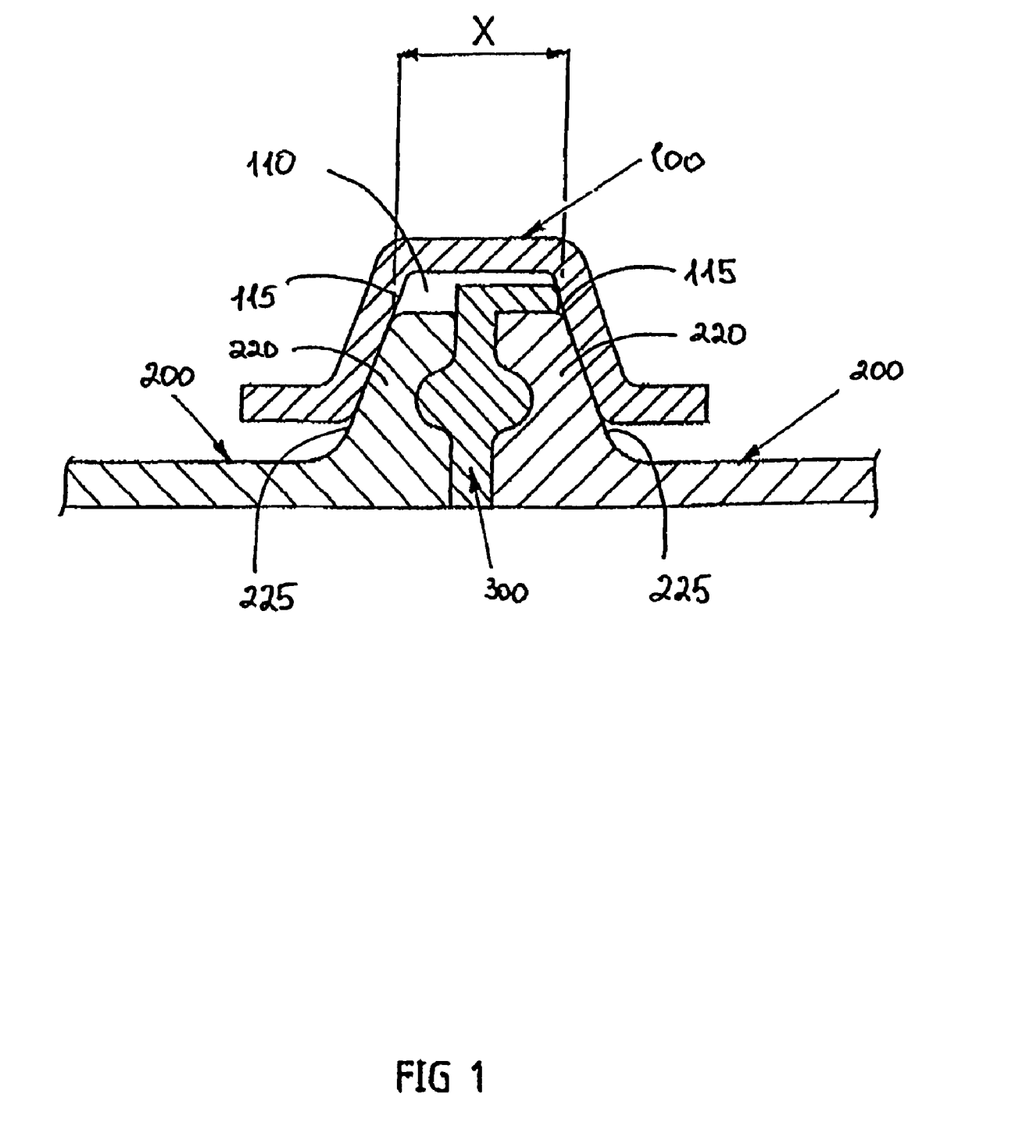
FIG. 1 is a partial cross-sectional view of a coupling clamp as it appears in the standards.

FIG. 1 shows a known coupling clamp 100 as illustrated in the standards. The clamp has an internal cavity 110 and is shown placed over flanges 220 of clamp liners 200 which have a gasket 300 placed therebetween. The value of clearance between contact faces of the side limbs 115 of the cavity 110 and tapered faces 225 of the flanges 220 must fall within a range specified in the standards. In practice however, the manner in which the internal cavity 110 fits over the flanges 220 differs from the ideal fit shown in the standards and in FIG. 1. The clamp liners 200 and the gasket 300 are made to tolerances specified in the standards and fluctuations within those tolerances result in fluctuations of dimension X (see FIG. 1) in the manufacture of clamp liners. Furthermore the thickness of the gasket 300 can be varied by the degree of tightness imparted on the flanges 220 and on the gasket 300 by the clamp 100 and the value of X thus can change accordingly.

Figure 2:
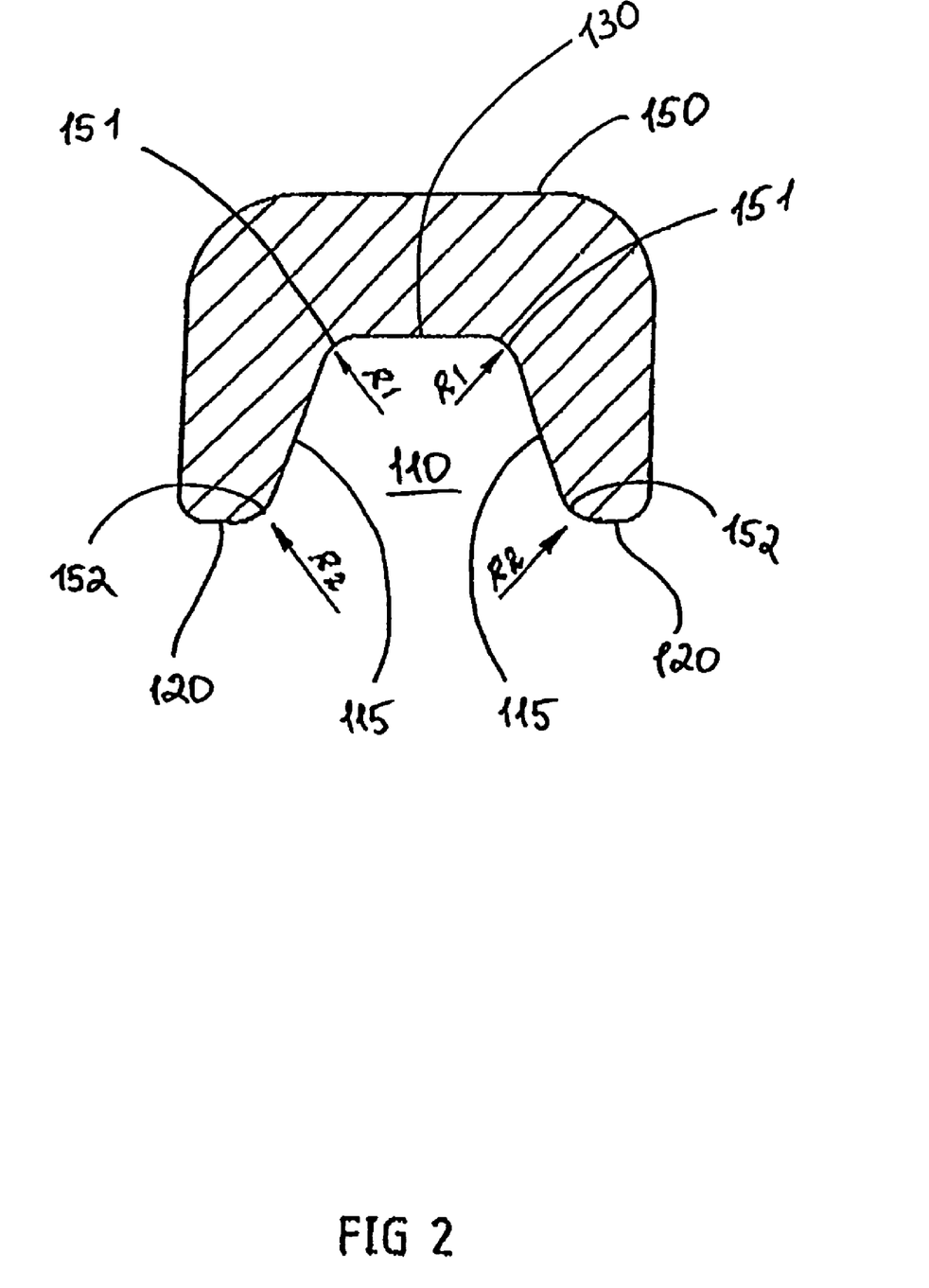
FIG. 2 is a partial cross-sectional view of a commercially available coupling clamp.
Figure 3:
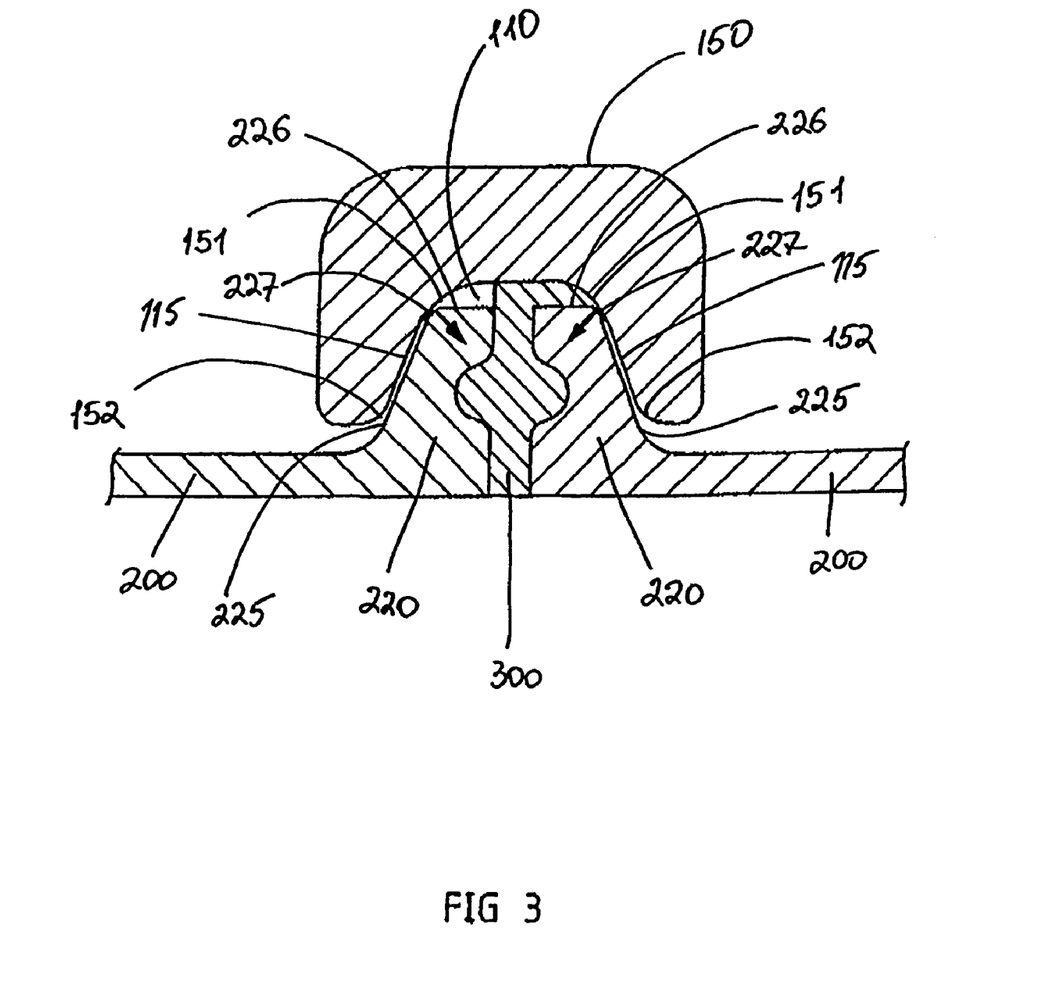
FIGS. 3 and 4 are partial cross-sectional views of commercially available coupling clamps fitted over clamp liners at open ends of the pipes being connected.

A commercially available clamp, a segment 150 of which is shown in FIG. 2, typically has a pair of first transitional surfaces 151 on the boundary between each contact face of the side limbs 115 and a non-contact face of the base portion 130 of the cavity 110. The transitional surfaces 151 have a radius $R_1$. The clamp 150 also has a pair of second transitional surfaces 152 on the boundary between the contact faces of the side limbs 115 and end faces 120 of the segment of the clamp 150. The transitional surfaces 152 have a radius $R_2$. Referring now to FIG. 3, if radii $R_1$ are relatively large, for example 2 mm in a clamp for a pipe of 38.1 mm diameter, and if the value of X is on its lowest limit, the first transitional surfaces 151 will seat on outer edges 227 of the flanges 220. This is an unsatisfactory condition because firstly the contact faces of the side limbs 115 of the cavity 110 which maintain alignment of the two flanges 220 are not in surface contact with the tapered faces 225 of the flanges and secondly the load from the clamp 150 is applied to the edges 227 of the flanges 220, as shown by arrows in FIG. 3, rather than to the tapered faces 225.

Figure 4:
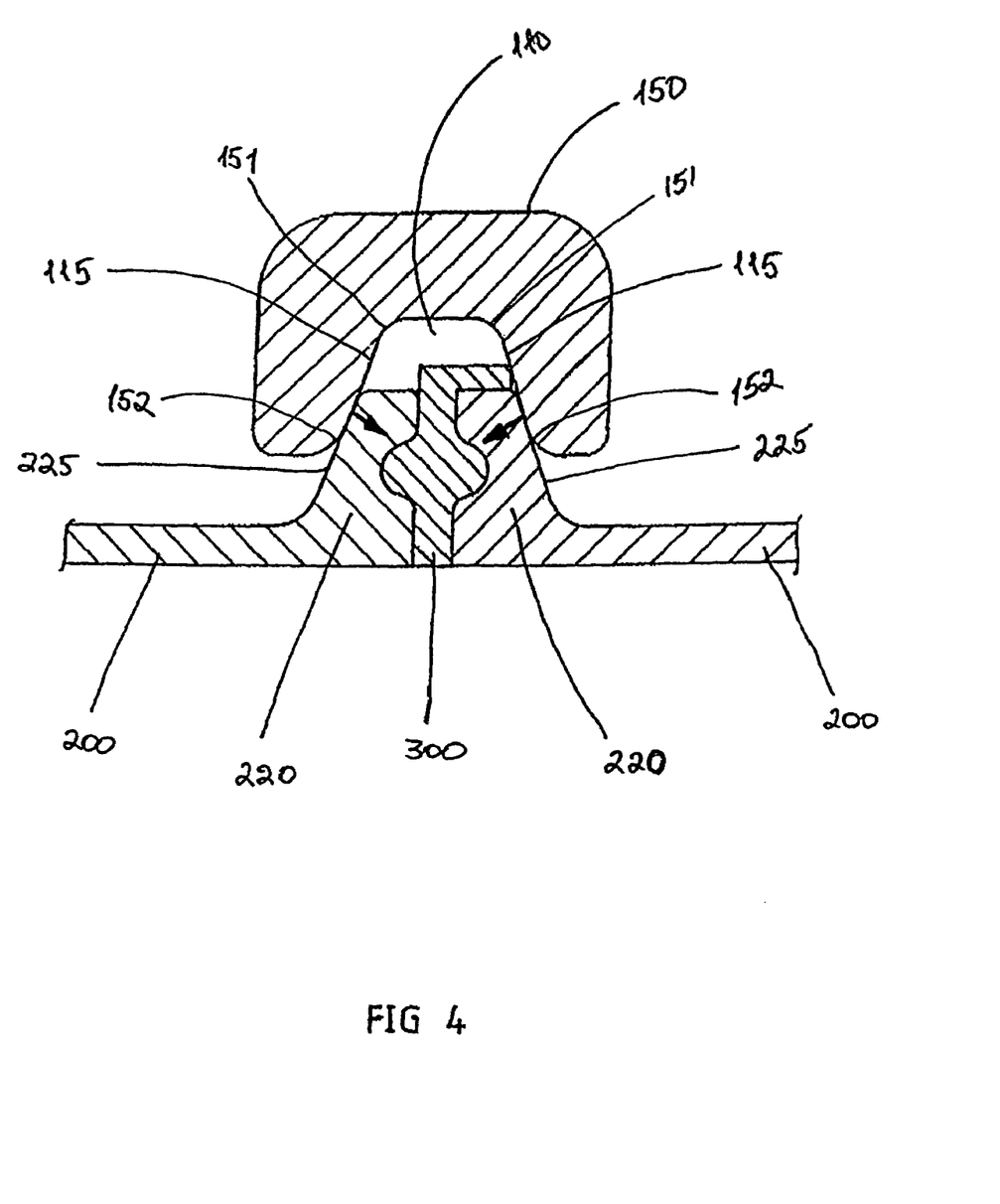

Alternatively, as shown in FIG. 4, if radii $R_2$ of the transitional surfaces 152 are large and the value of X is on its upper limit, then only the outermost regions of the contact faces of the side limbs 115 will abut the tapered faces 225 of the flanges 220. This is also an unsatisfactory condition because the actual points of contact between contact faces of the side limbs 115 and the tapered faces 225 is very limited. Furthermore, the load from the clamp 150 is applied to peripheral portions of the tapered faces 225 of the flanges 220 as shown by arrows in FIG. 4.

Figure 5:
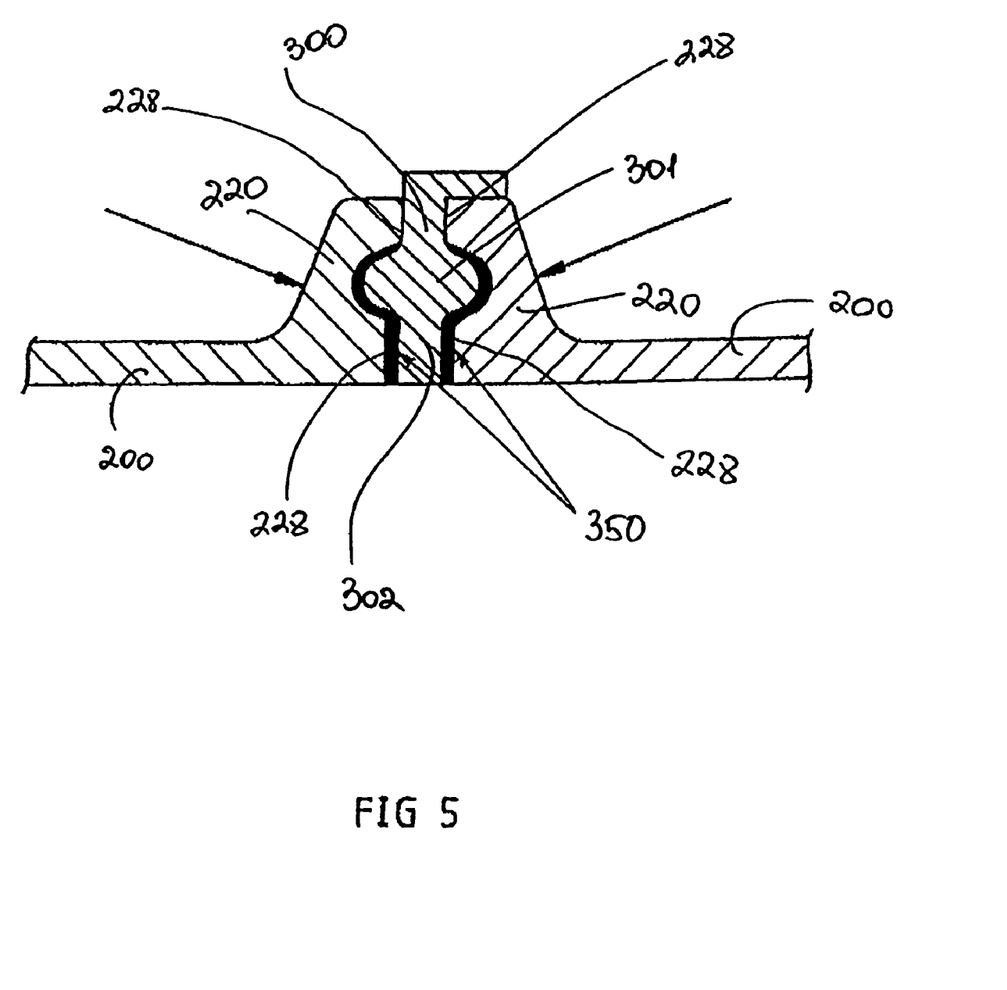
FIG. 5 is a partial cross-sectional view of clamp liners with a sealing gasket placed therebetween showing areas of compression of the gasket in an ideal arrangement of coupling clamp.

As shown in FIG. 5, in an ideal arrangement of a coupling clamp, the clamp engages the flanges 220 so that forces (indicated schematically by arrows in FIG. 5) acting from the coupling clamp on the flanges 220 are applied to areas 350 of the gasket 300 which include an expanded head 301 and inner regions 302. High sealing compression force in the areas 350 ensures efficient sealing at the interface between the gasket 300 and coupling faces 228 of the flanges and consequently, fluid-tightness and cleanliness of pipe connection. The probability of achieving this ideal condition in commercially manufactured coupling clamps is currently lower than desired. Compression forces when applied to these commercially manufactured coupling clamps are often applied to areas other than the preferred areas of the gasket.

Figure 6:
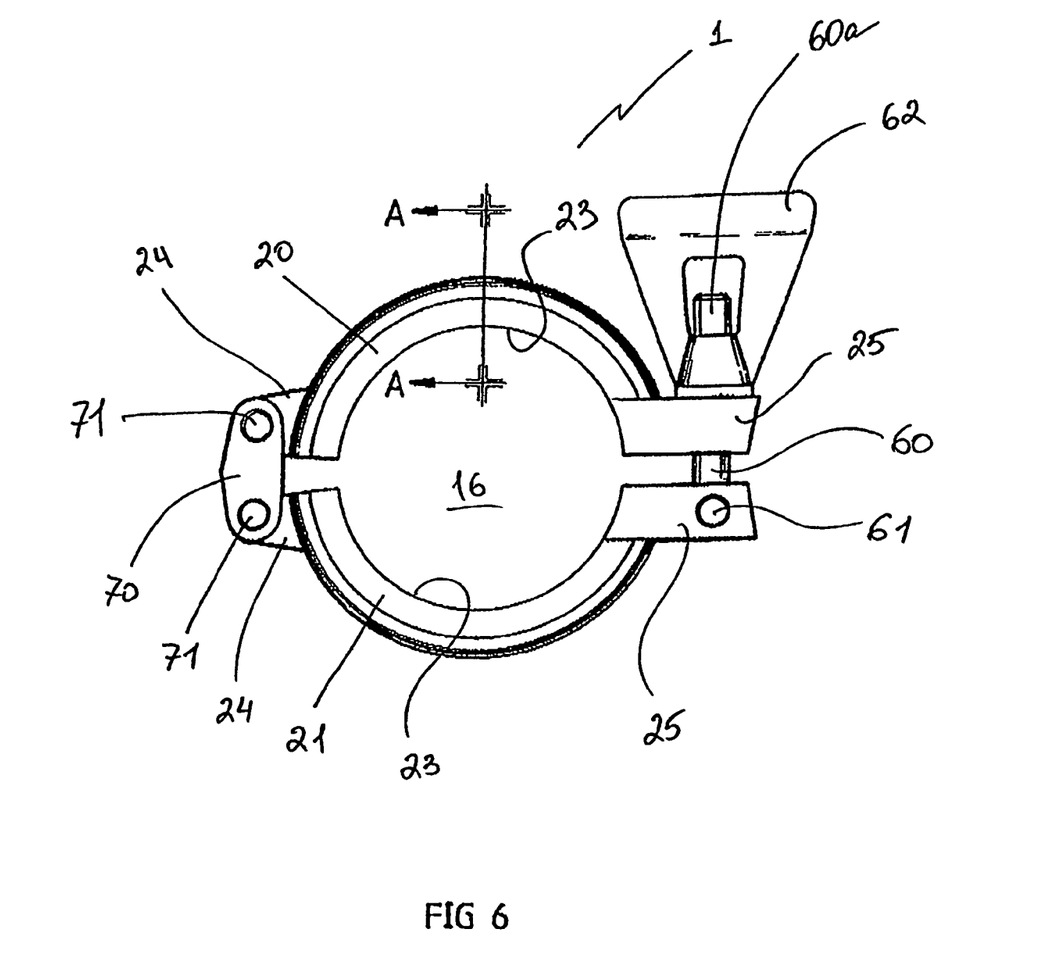
FIG. 6 is a front elevation of a coupling clamp according to the invention.
Figure 7:
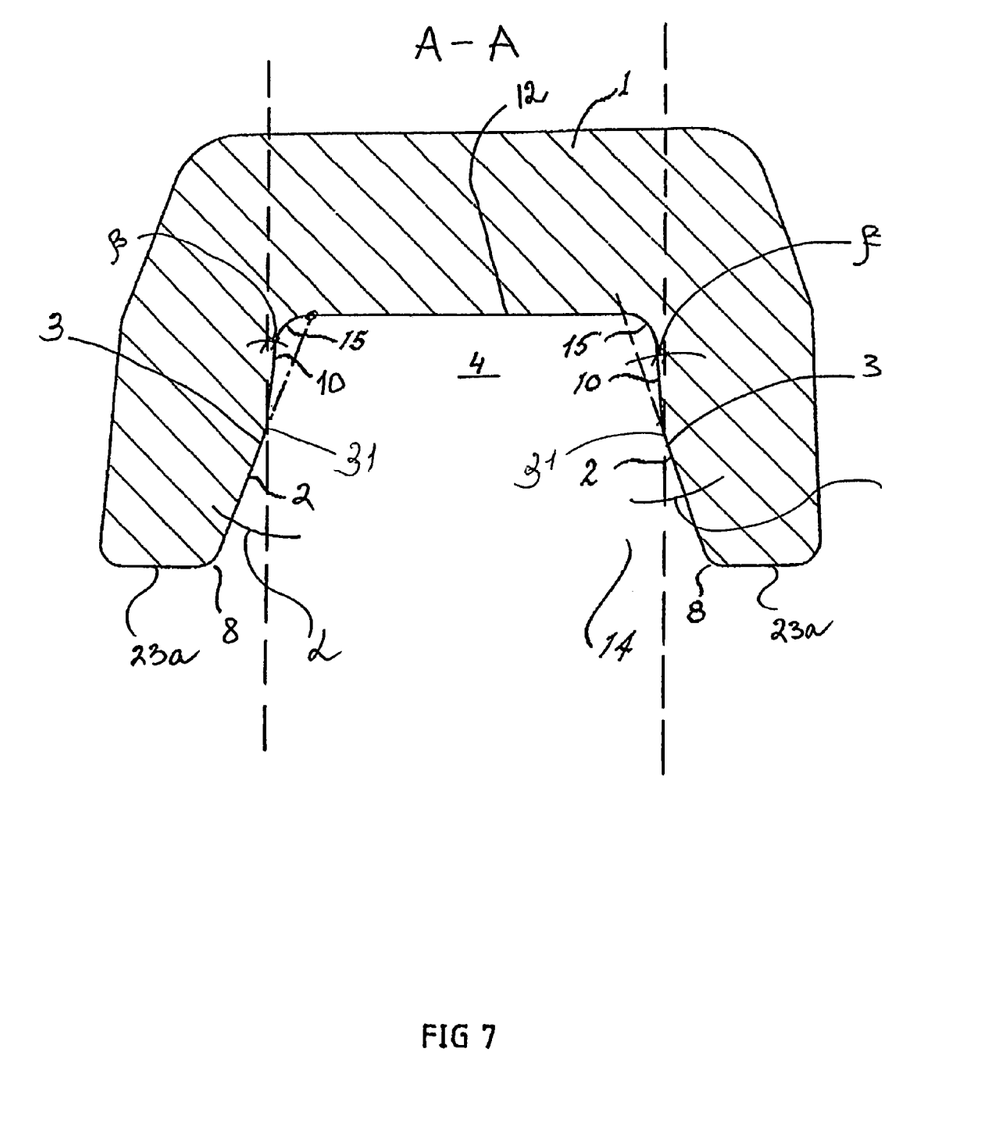
FIG. 7 is a cross-sectional view of a component half of the coupling clamp of FIG. 6 along the lines A-A in FIG. 6.
Figure 8:
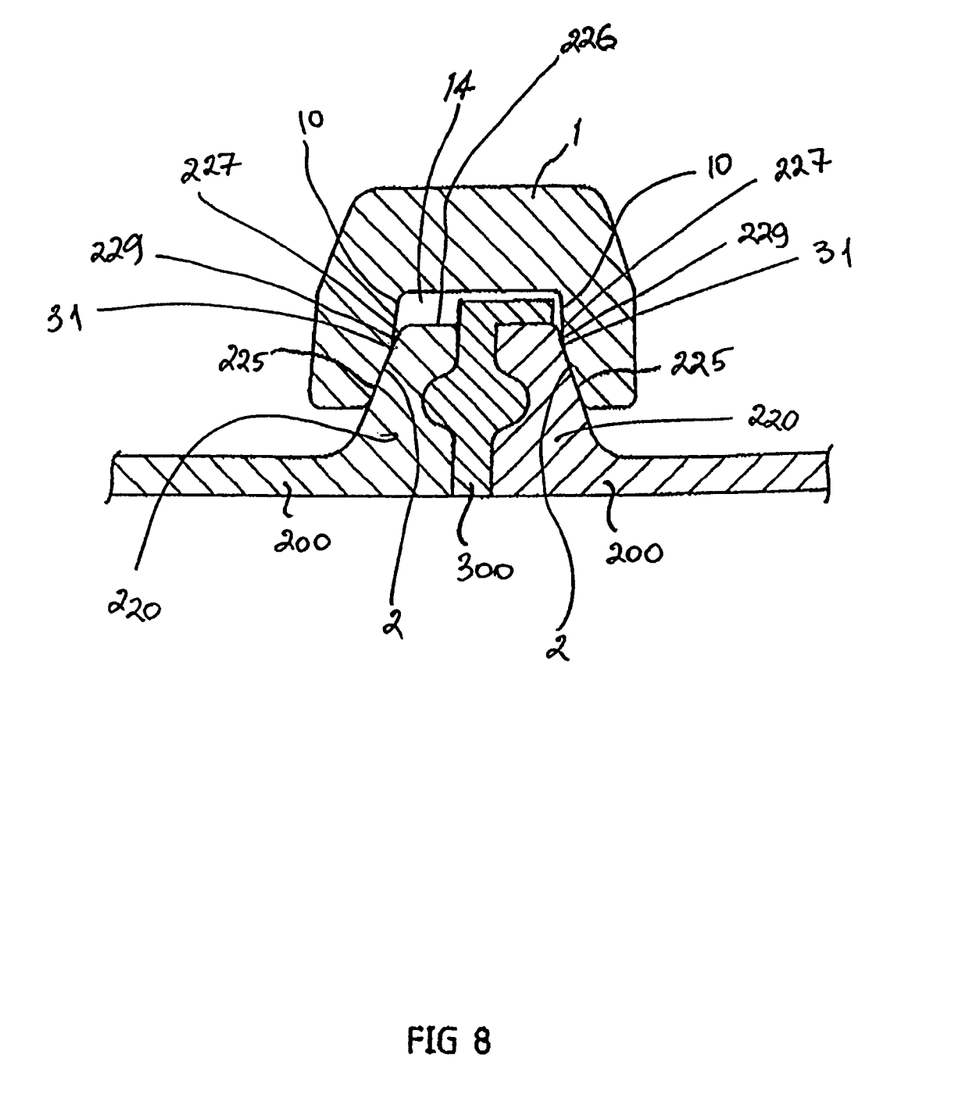
FIG. 8 is a partial cross-sectional view of the coupling clamp of FIG. 6 in an assembly with clamp liners of the pipes being connected.
Figure 9A:
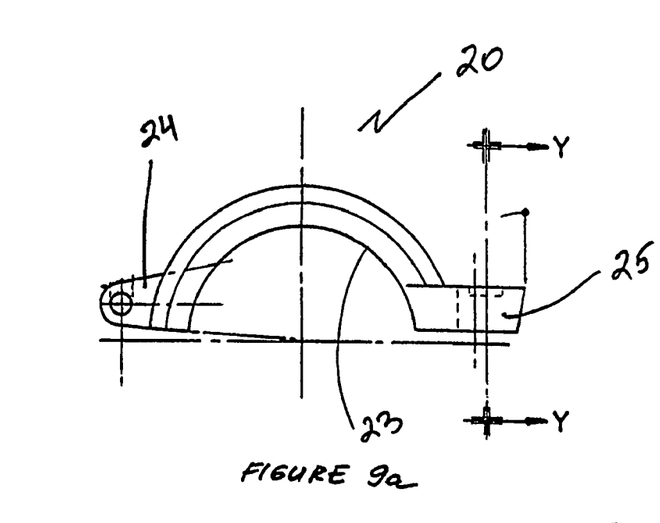
FIG. 9a is a front elevation of a component half of the coupling clamp of FIG. 6.
Figure 9B:
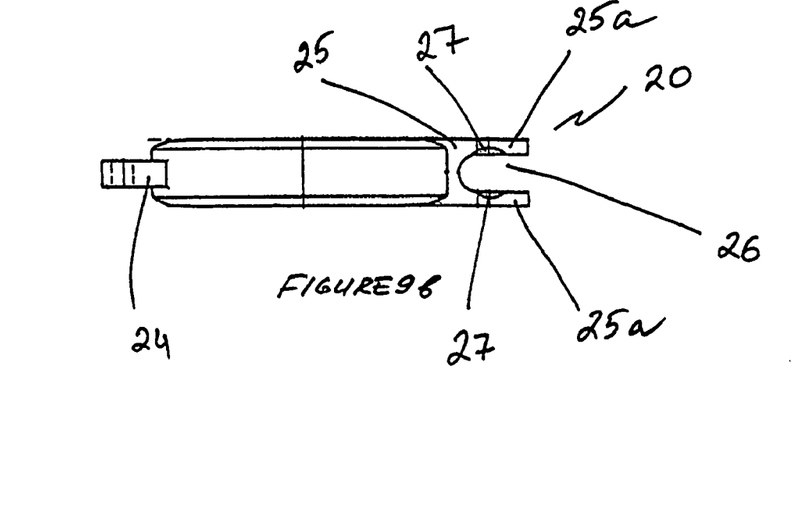
Figure 9C:
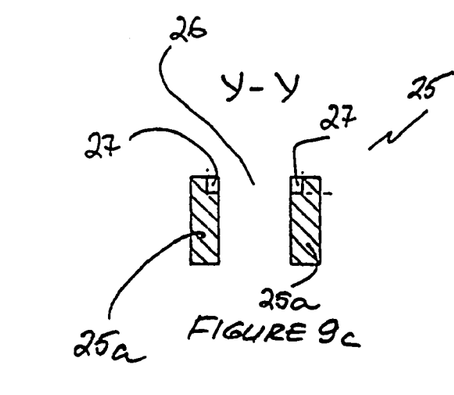
Figure 10A:
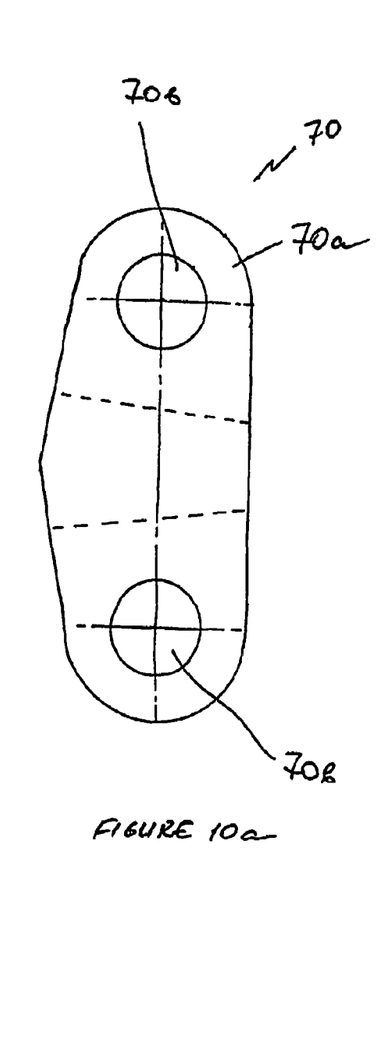
FIG. 10a is a front elevation of a hinge body of the coupling clamp of FIG. 6.
Figure 10B:
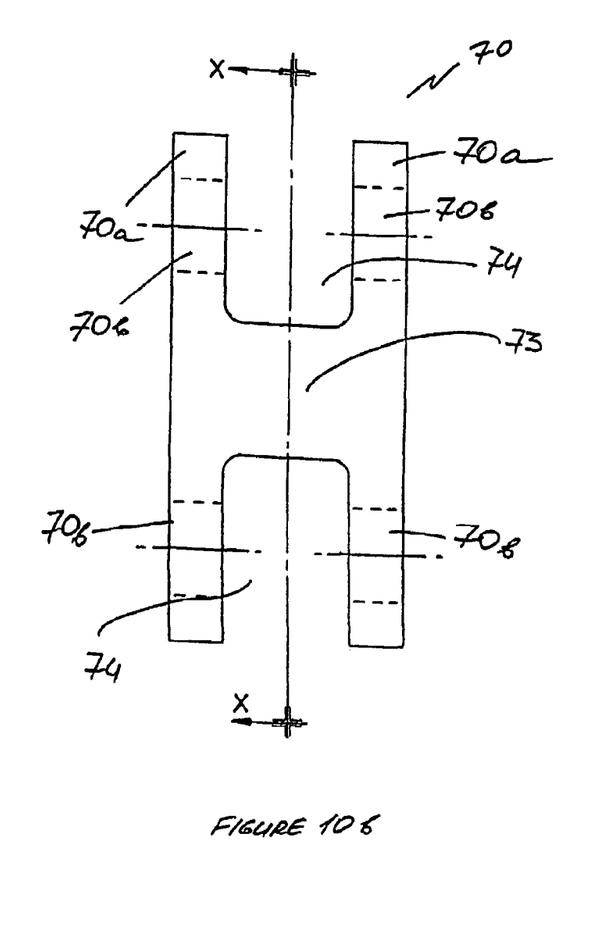
Figure 10C:
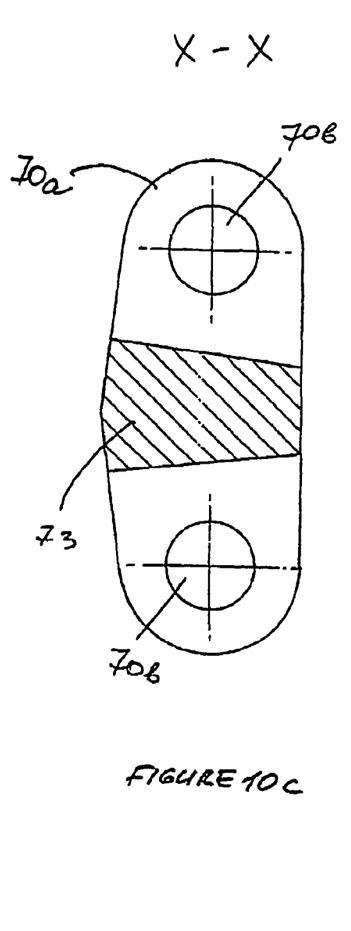

Referring to FIGS. 6 to 8, a coupling clamp of the invention is indicated generally by reference numeral 1. The clamp 1 comprises a pair of semi-annular component halves 20 and 21. Each component half 20, 21 has an arcuate cross-sectional profile 23 having a recess 14 (see FIG. 7) formed therein. When the component halves 20 and 21 are placed together with their recesses 14 facing each other, the recesses 14 form an annular recess (not indicated by a numeral) for receiving the flanges 220 of clamp liners 200 (see FIG. 8) and a central aperture 16 is defined by the recesses. Each component half 20 and 21 has an ear 24 at one end which is pivotally connected to a hinge body 70 via a pair of pins 71. Each component half 20, 21 also has a fork-shaped lug 25 (see also FIGS. 9a to 9c) at the other end. A bolt 60 is pivotally fastened to one of the lugs 25 via a pivot shaft 61. A nut 62 is provided for securing the component halves 20 and 21 in a closed position by tightening the nut 62 on the bolt 60.

As shown in FIG. 7, each recess 14 is defined by a pair of opposing side limbs 3 and a base portion. Each side limb 3 comprises a non-contact face 10 adjoining a non-contact face of the base portion 12 and a contact face 2 adjoining the non-contact face 10. The non-contact faces of the side limbs 10 and the non-contact face of the base portion 12 define an inner cavity 4. Each non-contact face of the side limbs 10 extends from an inner edge 31 of the corresponding contact face of the side limbs 2 towards the non-contact face of the base portion 12. The contact face of the side limbs 2 tapers towards the non-contact face of the base portion 12. The angle between the contact faces of the side limbs 2 matches the angle between the tapering faces 225 of flanges 220 of clamp liners 200.

BRIEF DESCRIPTION OF THE DRAWINGS

In the present embodiment, angles α of inclination of both contact faces of the side limbs 2 in relation to a plane perpendicular to the central axis (not shown) of the aperture 16 are the same, but it will be appreciated that these angles do not need to be necessarily the same and indeed, the angle of inclination of one of the contact faces of the side limbs 2 may differ from the angle of inclination of the other contact face of the side limb 2. In the present embodiment, the ideal value of the angle α is 20°, as defined in the standards, and this value may vary within a standard-defined tolerance. On assembly, the contact faces of the side limbs 2 abut corresponding tapered faces 225 of the flanges 220 which incline in relation to a plane of transverse section of the clamp liners 200 at the same standard angle of 20° which may vary within a standard-defined tolerance. In other embodiments the angle α may be 150 to 200 or even 15° to 30° to match the angles of inclination of tapered faces 225 of flanges 220 in different configurations of coupling clamps. In general, the invention is not limited to any particular or standard values of the angle α as long as the contact faces of the side limbs 2 taper at an angle substantially the same as the angle between the tapered faces 225 of a pair of flanges 220 when the flanges are coupled together. That is each contact face of the side limbs 2 in use is substantially parallel to the corresponding tapered face 225 of a flange 220 in order to enable sufficient abutting contact therebetween. In fact, the invention is not limited to the use only with clamp liners of a particular standard and indeed is suitable for coupling radially projecting flanges having tapering outer faces of clamp liners of various non-standard sizes and configurations or for coupling such radially projecting flanges of any devices such as ferrules, bushings, couplings, pipes, tubes and many others. Furthermore, the coupling clamp 1 is not limited to particular dimension values.

In the present embodiment, the non-contact faces of the side limbs 10 taper towards the non-contact face of the base portion 12 at a substantially shallow angle β in relation to the plane perpendicular to the central axis of the aperture 16. The angle β is the same for both of the non-contact faces of the side limbs 10 in the present embodiment. It will be appreciated that the angle β does not need to be necessarily the same for both of the non-contact faces of the side limbs 10 and indeed, the angle of inclination of one of the non-contact faces of the side limbs 10 may differ from the angle of inclination of the other non-contact face of the side limbs. In the present embodiment, the angle β is 5° and this value may vary within a pre-determined tolerance. It will also be appreciated that the angle β is not limited to 5° and indeed may be between 6° and 0°. In fact, the non-contact faces of the side limbs 10 may even diverge in the direction of the non-contact face of the base portion 12. In general, the non-contact faces of the side limbs 10 and the non-contact face of the base portion 12 may be sized and mutually disposed in any suitable manner as long as they define an inner cavity wider than the distance between imaginary extensions of the contact faces of the side limbs 2 towards the non-contact face of the base portion 12 so that in use to prevent the flanges and/or the gasket from contacting the non-contact faces of the side limbs 10 and the non-contact face of the base portion 12. The described above arrangement of the non-contact faces of the side limbs 10 and the non-contact face of the base portion 12 prevents incorrect load application on the flanges when the clamp is placed around the flanges.

The distance between the contact faces of the side limbs 2 matches, within a predetermined tolerance, the distance between the tapered faces 225 of flanges 220 when their coupling faces 228 are placed together, with a gasket 300 sandwiched therebetween. The length of the contact face 2 is less than length of the tapered face 225 of the mating radially projecting flange 220, and has a predetermined value which may vary within a predetermined tolerance. The length of the contact face 2 is defined as the distance between the non-contact face 10 and last point of contact for the contact face 2 remote from the non-contact face of the base portion 12 and the length of the tapered face 225 of the mating radially projecting flange 220 is defined as the distance between the widest section and the narrowest section of the tapered face 225. Such a combination of the distance between the contact faces of the side limbs 2 and their length has the effect that in use, when the coupling clamp 1 is located around the flanges 220, the contact faces of the side limbs 2 abut the tapered faces 225 along the entire length of the contact face of the side limbs 2, and their inner edges 31 seat on the outer faces 225 at the flanges 220 without projecting beyond the outer edges 227 of the flanges 220 regardless of fluctuations of that distance, that length and the dimensions of the clamp liners within their tolerances.

As shown in FIG. 8, in the present embodiment, the width of the contact faces of the side limbs 2 is such that when the clamp liners 200 and the seal 300 are manufactured to standard mid-tolerance dimensions, the inner edges 31 rest on the outer faces 225 and are slightly spaced apart from the outer edges 227, so that peripheral portions 229 of the outer faces 225 remain uncovered and sufficient area is reserved for the inner edges 31 to rest upon in case of fluctuations within their tolerances of dimensions of the clamp liners 200, the seal 300 and the distance between the contact faces of the side limbs 2 and their length. Furthermore, the above-described arrangement permits to achieve the abutment of the contact faces of the side limbs 2 with the tapered faces 225 when the distance between the tapered faces 225 fluctuates depending on the thickness of the sealing gasket 300. Since the contact faces of the side limbs 2, abut the tapered faces 225 along the entire length of the contact faces of the side limbs 2 without the non-contact faces of the side limbs 110 and the non-contact face of the base portion 12 being in contact with the flanges 220 or the gasket 300 regardless of fluctuations within tolerances of the dimensions of the recess 14, the flanges 220 or the gasket 300, the compression force applied by the coupling clamp 1 on the tapered faces 225 is always directed to the correct areas on the seal 300, such as the areas 350 shown in FIG. 5, thus ensuring that efficient fluid-tight seal is formed at the interface between the seal 300 and the coupling surfaces 228 of the flanges 220.

In the present embodiment, the diameter of the non-contact face of the base portion 12 is established from the standards. Radii 15 (see FIG. 7) have a predetermined value so as to ensure that the width of the non-contact face of the base portion 12 is such that it extends at least to, and preferably beyond, the points of intersection that would be made if the contact faces of the side limbs 2 were extended to or beyond the non-contact face of the base portion 12. This ensures that the distance between the non-contact faces of the side limbs 10 is greater than the distance between imaginary extensions of the contact faces of the side limbs 2 within the inner cavity 4 (see FIG. 7).

Radii 8 (see FIG. 7) of transitional surfaces between free portions 23a (see FIG. 7) of the inner surfaces 23 and the contact faces of the side limbs 2 have a predetermined value so as to ensure that the contact faces of the side limbs 2 are located as close as possible to the axes of the clamp liners 220/pipes being connected to ensure efficient abutment of the contact faces of the side limbs 2 on the tapered faces 225.

In use, the component halves 20, 21 are located around the flanges 220 of the clamp liners 200 and the nut 62 is screwed on the bolt 60 to secure the component halves 20, 21 around the flanges 220 and tightened to cause the contact faces of the side limbs 2 to press on the tapered faces 225 of the flanges thus providing a fluid-tight seal at the interface between the gasket 300 and the coupling faces 228 of the flanges 220. It will be appreciated that the invention is not limited to the use of a nut and bolt arrangement and any suitable means can be used for securing and tightening the component halves 20, 21.

Referring to FIGS. 6 and 9a to 9c, the fork-shaped lug 25 of a component half 20 has a pair of prongs 25a which define a space 26 therebetween for receiving the bolt 60. A recess 27 is formed in an outer face of each prong 25a to provide a seat for the nut 62 (see FIG. 6). In order to obtain the component half 21, a bore (not shown) is formed across the prongs 25a of a component half 20 for accommodating the pivot shaft 61 of the bolt 60 (see FIG. 6) to fasten the bolt 60 to the lug 25. In the closed position of the coupling clamp 1 (FIG. 6) the bolt 60 is pivoted to occupy the spaces 26 and a threaded end 60a of the bolt 60 projects beyond the outer face of the lug 25 of the component half 20. When the nut 62 is screwed and tightened on the bolt 60, a base portion (not shown) of the nut 62 seats in the recesses 27.

As shown in FIGS. 6 and 10a to 10c, the hinge body 70 comprises a pair of spaced apart plates 70a defining a gap 74 therebetween, each plate having a pair of apertures 70b for receiving the pins 71 (see FIG. 6), and an intermediate member 73 extends between the plates. Each aperture 70b of one plate 70a is co-axial with a corresponding aperture 70b of the other plate 70a. In an assembled coupling clamp 1, the ears 24 of the component halves 20 and 21 are received in the gap 74 and fastened to the hinge body 70 by the pins 71.

The above described arrangement of the lugs 25 and the ears 24 permits the component halves 20 and 21 to be interchangeable, thus reducing costs of manufacture and assembly of coupling clamps. The "one piece" hinge body 70 as distinct from known multi-piece hinge arrangements in coupling clamps allows to reduce the number of assembly steps, thus further reducing manufacture costs.

Although the use of the above described interchangeable component halves and a "one piece" connecting hinge body is preferred, the invention is not limited to the use of only such interchangeable component halves and such a connecting hinge body. Nor is the invention limited to a pivotal connection between the component halves. Known non-interchangeable component halves can also be used in the coupling clamp of the invention and indeed a multi-segment arrangement of the coupling claim is possible. Furthermore, although the component halves 20, 21 have been described as having a semi-annular configuration, it is possible to utilize component halves or multiple segments of any external configuration as long as there is provided an arcuate inner face with a recess such as the above described recess 14 in each component half of multiple segment.

It is to be understood that the invention is not limited to the specific details described above which are given by way of example only and that various modifications and alterations are possible without departing from the scope of the invention.

The invention claimed is:

1. A clamp for coupling mating radially projecting flanges, each flange having a coupling surface and a tapered face remote from the coupling surface, the clamp comprising:
   at least a pair of component halves, each half comprising a generally U-shaped cross-sectional profile including
      a base portion having a non-contact face including a straight non-contact portion,
      two opposing side limbs projecting from the base portion, each side limb having a contact face, the contact face of the side limb being distanced from the non-contact face of the base portion and tapering towards the non-contact face of the base portion at an angle enabling an abutting contact between the contact face of the side limb and the tapered face of the radially projecting flange, each side limb further including a non-contact face, a geometry of the contact face and the non-contact face of the side limb being configured such that the straight non-contact portion of the base portion extends at least to points of intersection of planes tangential to the contact faces of the side limbs with the non-contact face of the base portion, and
      a recess defined intermediate of the side limbs for receiving the mating radially projecting flanges; and
   a fastener for fastening the component halves together such that when the component halves are fastened, the recesses defined by the side limbs of the component halves face each other to define a central aperture therebetween,
   wherein the contact face of the side limb is inclined at an inclination angle in relation to a plane perpendicular to a central axis of the central aperture defined by the recesses of the components halves in a fastened position, and the non-contact face of the side limb is inclined at a shallower inclination angle than that of the contact face of the side limb in relation to the plane perpendicular to the central axis of the central aperture defined by the recesses of the components halves in the fastened position.

2. A clamp as claimed in claim 1, wherein the recess is of an arcuate shape.

3. A clamp as claimed in claim 1, wherein a length of the contact face is less than a length of the tapered face of the mating radially projecting flange, the length of the contact face being defined as a distance between the non-contact face of the side limb and a point of contact between the contact face and the tapered face most remote from the non-contact face of the base portion, and the length of the tapered face of the mating radially projecting flange being defined as a distance between a widest section and a narrowest section of the tapered face.

4. A clamp as claimed in claim 1, wherein a distance between opposing non-contact faces of the two side limbs is greater than a distance between the planes tangential to the contact faces at any point.

5. A clamp as claimed in claim 1, wherein a gasket is placed between the coupling surfaces of the coupling mating radially projecting flanges.

6. A clamp as claimed in claim 1, wherein the inclination angle is between 15° to 30°.

7. A clamp as claimed in claim 1, wherein the inclination angle is between 15° to 20°.

8. A clamp as claimed in claim 1, wherein the inclination angle is 20°.

9. A clamp as claimed in claim 1, wherein the shallower inclination angle is between 0° to 6°.

10. A clamp as claimed in claim 1, wherein the component halves are substantially identical.

11. A clamp for coupling mating radially projecting flanges, each flange having a coupling surface and a tapered face remote from the coupling surface, the clamp comprising:
    at least a pair of component halves, each half comprising a fork-shaped lug and a generally U-shaped cross-sectional profile including
       a base portion having a non-contact face including a straight non-contact portion,
       two opposing side limbs projecting from the base portion, each side limb having a contact face, the contact face of the side limb being distanced from the non-contact face of the base portion and tapering towards the non-contact face of the base portion at an angle enabling an abutting contact between the contact face of the side limb and the tapered face of the radially projecting flange, each side limb further including a non-contact face, a geometry of the contact face and the non-contact face of the side limb being configured such that the straight non-contact portion of the base portion extends at least to points of intersection of planes tangential to the contact faces of the side limbs with the non-contact face of the base portion, and
       a recess defined intermediate of the side limbs for receiving the mating radially projecting flanges; and
    a fastener for fastening the component halves together such that when the component halves are fastened, the recesses defined by the side limbs of the component halves face each other to define a central aperture therebetween.

12. A clamp as claimed in claim 11, wherein the fastener comprises a nut and a bolt, the bolt being pivotally mounted on a first fork-shaped lug of one component half, passing through a space between prongs of a second fork-shaped lug of the other component half and being secured in position by the nut.

13. A clamp for coupling mating radially projecting flanges, each flange having a coupling surface and a tapered face remote from the coupling surface, the clamp comprising:
    at least a pair of component halves, each half comprising a generally U-shaped cross-sectional profile including a base portion having a non-contact face including a straight non-contact portion, two opposing side limbs projecting from the base portion, each side limb having a contact face, the contact face of the side limb being distanced from the non-contact face of the base portion and tapering towards the non-contact face of the base portion at an angle enabling an abutting contact between the contact face of the side limb and the tapered face of the radially projecting flange, each side limb further including a non-contact face, a geometry of the contact face and the non-contact face of the side limb being configured such that the straight non-contact portion of the base portion extends at least to points of intersection of planes tangential to the contact faces of the side limbs with the non-contact face of the base portion, and a recess defined intermediate of the side limbs for receiving the mating radially projecting flanges;

a fastener for fastening the component halves together such that when the component halves are fastened, the recesses defined by the side limbs of the component halves face each other to define a central aperture therebetween; and a hinge body, each component half comprising an ear positioned at one end of the component half, and each ear being pivotally connectable to the hinge body.

14. A clamp as claimed in claim 13, wherein the hinge body comprises a pair of spaced-apart plates defining an opening there between and the hinge body comprises an intermediate member connecting the plates, the ears being received in the opening.

15. A clamp for coupling mating radially projecting flanges, each flange having a coupling surface and a tapered face remote from the coupling surface, the clamp comprising:

at least a pair of component halves, each half comprising a generally U-shaped cross-sectional profile including a base portion having a non-contact face, two opposing side limbs projecting from the base portion, each side limb having a contact face distanced from the non-contact face of the base portion, the contact face tapering towards the non-contact face of the base portion at an angle enabling an abutting contact with the tapered face of the mating radially projecting flanges, each side limb further having a non-contact face, each contact face having a length which is less than a length of the tapered face of the mating radially projecting flange, the length of the contact face being defined as a distance between the non-contact face of the side limb and a point of contact of the contact face most remote from the non-contact face of the base portion, the length of the tapered face of the mating radially projecting flange being defined as a distance between a widest section and a narrowest section of the tapered face, the contact faces and the non-contact faces of opposing side limbs being configured such that at any selected level a distance between the opposing non-contact faces of the side limbs is greater than a distance between planes tangential to the contact faces at the same level, the contact faces and the non-contact faces of opposing side limbs being further configured such that the non-contact face of the base portion extends at least to points of intersection of the planes tangential to the contact faces with the base portion, a radius portion formed between the base portion and the non-contact face of each side limb, the radius portion having a predetermined radius value configured such that the non-contact face of the base portion extends at least to the points of intersection of the planes tangential to the contact faces with the base portion, and a recess defined intermediate of the side limbs for receiving the mating radially projecting flanges; and a fastener for fastening the component halves together such that when the component halves are fastened, the recesses defined by the opposing side limbs face each other to define a central aperture therebetween, the non-contact faces of the side limbs extending at a shallower angle than that of the contact face of the side limbs in relation to a plane perpendicular to a central axis of the central aperture.

\* \* \* \* \*